(12) United States Patent
Yakov et al.

(10) Patent No.: US 8,804,763 B2
(45) Date of Patent: Aug. 12, 2014

(54) TRANSMISSION OF DATA OVER PARALLEL LINKS

(75) Inventors: Gaby Yakov, Nes Ziona (IL); Ofer Sharivker, RaAnana (IL)

(73) Assignee: Ceragon Networks Ltd., Tel-Aviv (IL)

( * ) Notice: Subject to any disclaimer, the term of this patent is extended or adjusted under 35 U.S.C. 154(b) by 728 days.

(21) Appl. No.: 12/669,044

(22) PCT Filed: Jul. 15, 2008

(86) PCT No.: PCT/IL2008/000984
§ 371 (c)(1),
(2), (4) Date: May 13, 2010

(87) PCT Pub. No.: WO2009/010973
PCT Pub. Date: Jan. 22, 2009

(65) Prior Publication Data
US 2010/0215058 A1   Aug. 26, 2010

Related U.S. Application Data

(60) Provisional application No. 60/929,943, filed on Jul. 19, 2007, provisional application No. 61/006,518, filed on Jan. 17, 2008.

(51) Int. Cl.
*H04J 3/24* (2006.01)
*H04L 12/28* (2006.01)

(52) U.S. Cl.
USPC ............ 370/474; 370/395.21; 370/470

(58) Field of Classification Search
USPC ............ 370/207, 395.21, 231, 235, 465, 470, 370/474, 475, 506
See application file for complete search history.

(56) References Cited

U.S. PATENT DOCUMENTS

| 6,654,824 | B1 * | 11/2003 | Vila et al. ................. 710/60 |
| 7,337,231 | B1 * | 2/2008 | Li ........................... 709/231 |
| 7,593,380 | B1 * | 9/2009 | Ferguson et al. ........... 370/342 |
| 2002/0181458 | A1 * | 12/2002 | Amidan et al. ............ 370/389 |
| 2008/0144713 | A1 * | 6/2008 | Kimmich et al. ........ 375/240.02 |

FOREIGN PATENT DOCUMENTS

| EP | 1311096 | 5/2003 |
| WO | WO 00/52831 | 9/2000 |

OTHER PUBLICATIONS

International Search Report Dated Nov. 12, 2008 From the International Searching Authority Re.: Application No. PCT/IL2008/000984.
Written Opinion Dated Nov. 12, 2008 From the International Searching Authority Re.: Application No. PCT/IL2008/000984.

* cited by examiner

*Primary Examiner* — Benjamin H Elliott, IV

(57) ABSTRACT

A method of transmitting data over a plurality of parallel transmission links, including dividing the data into a plurality of portions, and for each one of the portions in consecutive order providing the portion to a transmitter, and sending the portion over a transmission link connected to the transmitter, wherein the providing is made according to a plan which is independent of addressing information associated with the data. A method for reassembling data from a plurality of portions of the data received over a plurality of parallel transmission links including copying a first portion, according to an order among the portions, thereby producing partially reassembled data, from each one of the plurality of parallel transmission links, copying and appending a next portion to the partially reassembled data, according to the order among the portions, and continuing the copying and appending until the data has been completely reassembled. Related apparatus and methods are also described.

24 Claims, 8 Drawing Sheets

TRANSMISSION OF DATA OVER PARALLEL LINKS

RELATED APPLICATIONS

This application is a National Phase Application of PCT Patent Application No. PCT/IL2008/000984 having International Filing Date of Jul. 15, 2008, which claims priority from U.S. Provisional Patent Application Nos. 60/929,943, filed on Jul. 19 2007 and 61/006,518, filed on Jan. 17, 2008. The contents of the above Applications are all incorporated herein by reference.

FIELD OF THE INVENTION

The present invention relates to a method and apparatus for transmission of data over parallel transmission links, and, more particularly, but not exclusively to dividing the data among the links according to a capacity of the links.

BACKGROUND OF THE INVENTION

Every communication system transmission link has a bandwidth limiting how much data can be transmitted by the transmission link. One way of exceeding a single transmission link bandwidth is by using several parallel links, and dividing data among the parallel links.

An IEEE 802.3ad protocol, also termed "Link Aggregation", is a computer networking term which describes using multiple Ethernet network cables/ports in parallel to increase link speed beyond limits of one single cable or port, and to increase redundancy for higher availability. The 802.3ad protocol was designed to pass over multiple hops and over existing hardware.

The IEEE 802.3ad approach was adapted by wireless systems to split Ethernet data between two radio systems.

Reference is now made to FIG. 1, which is a simplified pictorial illustration of a prior art implementation of Ethernet link aggregation using two parallel wireless links. A first node, termed an ingress link aggregation group 101, receives Ethernet data packets via an Ethernet interface 100, and transmits the Ethernet data packets over a transmission link to a second node, termed an egress link aggregation group 102. The ingress link aggregation group 101 contains two Ethernet radio systems 110. The two Ethernet radio systems 110 are connected to each other by an Ethernet interface 120. Entire Ethernet data packets are sent to either one or the other of the two Ethernet radio systems 110, and transmitted over wireless media 130. The entire Ethernet data packets are received by two Ethernet radio systems 110 comprised in the egress link aggregation group 102. An Ethernet interface 120 connects the two Ethernet radio systems 110 in the egress link aggregation group 102. The two Ethernet radio systems 110 send the Ethernet data packets received, via an Ethernet interface 100 comprised in the egress link aggregation group 102, on to their destination.

Some drawbacks of the 802.3ad approach are:

1. Data is split based on the fact that the data contains many different MAC addresses at any given moment. The 802.3ad approach splits the data based on a mathematical hashing function, which splits the flow (a flow is a series of packets that all contain the same source and destination addresses—Layer 2, Layer 3, and upper layer addresses) based on different flows having different addresses. If an incoming stream contains only one flow of data, the 802.3ad approach directs all the data to a single interface. In case of radio, the data is directed to a single radio, while another radio remains unused.

2. Actual throughput of the 802.3ad approach depends on an actual number and distribution of flows in the Ethernet interface. In cases of a small number of active flows, the data may be split very unequally between two radios 3. Data is split unequally between the two radios, creating a situation where one radio is unable to pass the flows which are directed to it, while the other radio remains almost unused.

It is to be appreciated that the Ethernet data packets are defined at Level 3 of the 7 level OSI communication model.

As radio network links are typically bottlenecks, using the radio network links in a non optimal way is a major drawback for systems which use 802.3ad to split data between the radio network links.

There is thus a widely recognized need for, and it would be highly advantageous to have, a method and a system devoid of the above limitations.

The disclosures of all references mentioned above and throughout the present specification, as well as the disclosures of all references mentioned in those references, are hereby incorporated herein by reference.

SUMMARY OF THE INVENTION

The present invention seeks to provide an improved method and apparatus for transmission of data over a plurality of links in parallel, and, more particularly but not exclusively, an improved method and apparatus for dividing the data among the links according to their capacity.

According to one aspect of the present invention there is provided a method of transmitting data over a plurality of parallel transmission links, including dividing the data into a plurality of portions of the data, and for each one of the portions of the data in consecutive order providing the portion of the data to a transmitter, and sending the portion of the data over a transmission link connected to the transmitter, wherein the providing is made according to a plan which is independent of addressing information associated with the data.

Optionally, the providing further includes receiving a request from the transmitter for the portion of the data.

Optionally, at least one of the portions of the data is smaller than a data packet.

Optionally, the plurality of transmission links are associated with a plurality of plans, and the plurality of plans are configured to achieve a distribution of data among the transmission links from one of the group consisting of distribution of substantially equal quantities of the data among the transmission links, and a distribution of quantities of the data among the transmission links substantially proportional to transmission capacities of the transmission links. Optionally, the plan associated with the transmission link specifies a transmission rate to be used over the transmission link. Optionally, the plan associated with the transmission link includes a transmission constellation to be used over the transmission link. Optionally, the transmission constellation includes a bitmap.

Optionally, the plurality of parallel transmission links includes at least one wireless link. Optionally, the plan associated with the wireless link includes an Adaptive Code Modulation (ACM) constellation.

Optionally further including changing the plan over time, corresponding to changes in the transmission capacity of the associated transmission link.

Optionally, the data includes at least one of the following types of data: a packet of data according to layer 2 of the seven layer OSI Basic Reference Model, data comprised in an Ethernet network, data comprised in a Time Division Multiplexed (TDM) network, data comprised in a PDH (Plesiochronous Digital Hierarchy) network, data comprised in an SDH (Synchronous Digital Hierarchy) network, data comprised in a SONET network, data comprised in an E1 network, and data comprised in a T1 network.

Optionally, each one of the portions of the data includes an integer multiple of a data unit, the data unit selected from one of the group consisting of a bit, a 4-bit nibble, an 8-bit byte, a 16-bit word, a 32-bit word, and a 64-bit word.

Optionally, further including sending data specifying the plan associated with the transmission link over the transmission link.

According to another aspect of the present invention there is provided a method for reassembling data from a plurality of portions of the data received over a plurality of parallel transmission links including copying a first portion of the data, according to an order among the portions of the data, thereby producing partially reassembled data, from each one of the plurality of parallel transmission links, copying and appending a next portion of the data to the partially reassembled data, according to the order among the portions of the data, and continuing the copying and appending until the data has been completely reassembled.

Optionally, the order among the portions of the data is determined based, at least partly, on a plurality of plans, each of the plans associated with a respective one of the transmission links. Optionally, at least one plan associated with one of the transmission links is based, at least partly, on transmission capacity of the transmission link. Optionally, further including changing the at least one plan over time, corresponding to changes in the transmission capacity of the transmission link. Optionally, at least one plan associated with one of the transmission links is based, at least partly, on data specifying the at least one plan sent over the transmission link.

Optionally, at least one plan associated with one of the transmission links includes a transmission constellation. Optionally, the transmission constellation includes a bitmap.

Optionally, the plurality of parallel transmission links includes at least one wireless link. Optionally, the plan associated with the wireless link includes an Adaptive Code Modulation (ACM) constellation.

Optionally, the reassembled data includes at least one packet of data according to layer 2 of the seven layer OSI Basic Reference Model. Optionally, each one of the portions of the data includes an integer multiple of a data unit, the data unit selected from one of the group consisting of a bit, a 4-bit nibble, an 8-bit byte, a 16-bit word, a 32-bit word, and a 64-bit word.

According to yet another aspect of the present invention there is provided apparatus for transmitting data over a plurality of parallel transmission links, including a plurality of transmitters, each of the transmitters configured to transmit at least one portion of the data over one of the transmission links, and a data splitting unit configured to provide at least one portion of the data to each one of the plurality of transmitters.

Optionally, each of the transmitters is configured to send a request for the at least one portion of the data to the data splitting unit, and the data splitting unit is configured to provide the at least one portion of the data in response to the request.

Optionally, the request is made according to a plan associated with the transmitter, the plan based, at least partly, on transmission capacity of the transmission link over which the transmitter is configured to transmit.

Optionally, the plan associated with the transmitter specifies a transmission rate. Optionally, the plan associated with the transmitter includes a transmission constellation. Optionally, the transmission constellation includes a bitmap.

Optionally, the plurality of transmitters includes at least one wireless transmitter.

Optionally, the plan associated with the wireless transmitter includes an Adaptive Code Modulation (ACM) constellation.

Optionally, further including changing the plan over time, corresponding to changes in the transmission capacity of the transmission link over which the transmitter is configured to transmit.

Optionally, the data includes at least one packet of data according to layer 2 of the seven layer OSI Basic Reference Model. Optionally, the portion of the data includes an integer multiple of a data unit, the data unit selected from one of the group consisting of a bit, a 4-bit nibble, an 8-bit byte, a 16-bit word, a 32-bit word, and a 64-bit word. Optionally, further including sending data specifying the plan associated with the transmitter over the transmission link for which the transmitter is configured.

According to another aspect of the present invention there is provided apparatus for reassembling data from a plurality of portions of the data received from a plurality of parallel transmission links including a plurality of receivers configured to receive at least one portion of the data from a plurality of respective associated transmission links, and a data merging unit configured to copy a first portion of the data from a receiver, according to an order among the portions of the data, thereby producing partially reassembled data, from each one of the plurality of parallel transmission links, copy and append a next portion of the data to the partially reassembled data, according to the order among the portions of the data, and continue the copying and appending until the data has been completely reassembled.

Optionally, the order among the portions of the data is determined based, at least partly, on a plurality of plans, each of the plans associated with a respective one of the transmission links. Optionally, at least one plan associated with one of the transmission links is based, at least partly, on transmission capacity of the transmission link. Optionally, further including changing the at least one plan over time, corresponding to changes in the transmission capacity of the transmission link. Optionally, at least one plan associated with one of the transmission links is based, at least partly, on data specifying the at least one plan sent over the transmission link.

Optionally, at least one plan associated with one of the transmission links includes a transmission constellation. Optionally, the transmission constellation includes a bitmap.

Optionally, the plurality of receivers includes at least one wireless receiver. Optionally, the plan associated with the wireless link includes an Adaptive Code Modulation (ACM) constellation.

Optionally, the reassembled data includes at least one packet of data according to layer 2 of the seven layer OSI Basic Reference Model. Optionally, each one of the portions of the data includes an integer multiple of a data unit, the data unit selected from one of the group consisting of a bit, a 4-bit nibble, an 8-bit byte, a 16-bit word, a 32-bit word, and a 64-bit word.

According to yet another aspect of the present invention there is provided a method of transmitting data over a plurality of parallel transmission links, including dividing the data into a plurality of portions of the data, and for each one of the portions of the data in consecutive order providing the portion of the data to a transmitter, and sending the portion of the data over a transmission link connected to the transmitter, wherein the providing is made according to a plan associated with the transmission link, the plan based, at least partly, on transmission capacity of the transmission link.

According to another aspect of the present invention there is provided a method of transmitting data over a plurality of parallel transmission links, including dividing the data into a plurality of portions of the data, and for each one of the portions of the data in consecutive order providing the portion of the data to a transmitter, and sending the portion of the data over a transmission link connected to the transmitter, wherein the portion of the data is smaller than a data packet.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
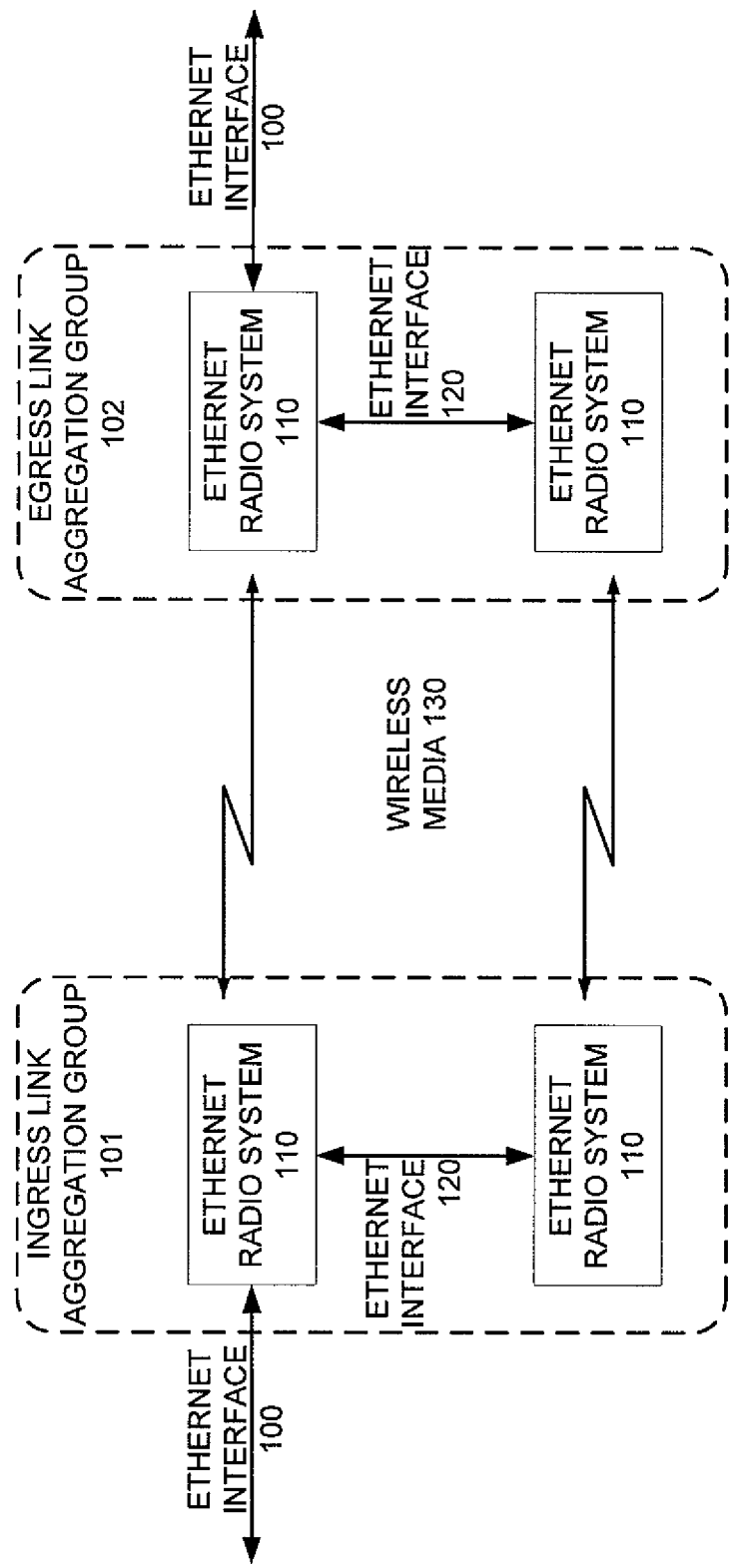
FIG. 1 is a simplified pictorial illustration of a prior art implementation of Ethernet link aggregation using two parallel wireless links.

The present embodiments comprise an apparatus and a method for transmitting data over a plurality of parallel transmission links. More particularly, the present embodiments comprise an improved method and apparatus for dividing the data among the parallel links according to a capacity of the links.

By way of a non-limiting example, an embodiment of the present invention can be used to transmit high capacity Ethernet traffic over two radio links, optimally splitting the traffic between the two radio links. In many cases Ethernet throughput exceeds the capacity of one radio link. In such cases, two radio links are connected in parallel to transmit the Ethernet traffic. Embodiments of the present invention split the traffic between the two radio links, achieving more than the capacity of each of the two radio links. In some embodiments, the traffic is split without requiring link aggregation. Optionally the split is not dependent on MAC addresses.

The principles and operation of an apparatus and a method for transmitting data over a plurality of parallel links according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The term "radio link" in all its forms is used throughout the present specification and claims interchangeably with the terms "wireless" and "wireless link" and their corresponding forms, and the with the terms "link" and "transmission link" and their corresponding forms, to represent a transmission link from a first node to a second node.

Given several parallel links, each connecting a first node and a second node, and given data to be transmitted from the first node to the second, it is possible to split the data among the parallel links, and achieve better throughput than one link can provide.

It is to be appreciated that the data to be transmitted does not have to be any standard data size. The data can be an aggregate of data packets, a single data packet, a clump of data comprising a fraction or fractions of a data packet and whole data packets, and a portion of a data packet, such as a byte.

The data is preferably split into portions. The portion sizes are controlled in a manner which enables apportioning to each link a suitable amount of data to transmit. The apportioning is done so as to achieve specific apportioning targets, such as, for example, equal distribution among the links; a distribution in a fixed proportion to bandwidths of the links, and a user configured distribution for each link between maximum and minimum bandwidth of each link.

By controlling data sent over the links according to amounts of data rather than source, destination, and other non-capacity-related properties, the apportioning targets are achieved.

It is to be appreciated that the splitting of data among parallel links and subsequent recombining is useful, for example, for implementing a wireless link in an Ethernet network, since wireless presently does not have bandwidth equal to Ethernet. Other examples are a PDH (Plesiochronous Digital Hierarchy) network and an E1/T1 network. The splitting and subsequent recombining are useful in all cases where a broadband transmission needs to pass over a narrower band technology.

A general description of an operation of an embodiment of the present invention will now be described.

Figure 2A:
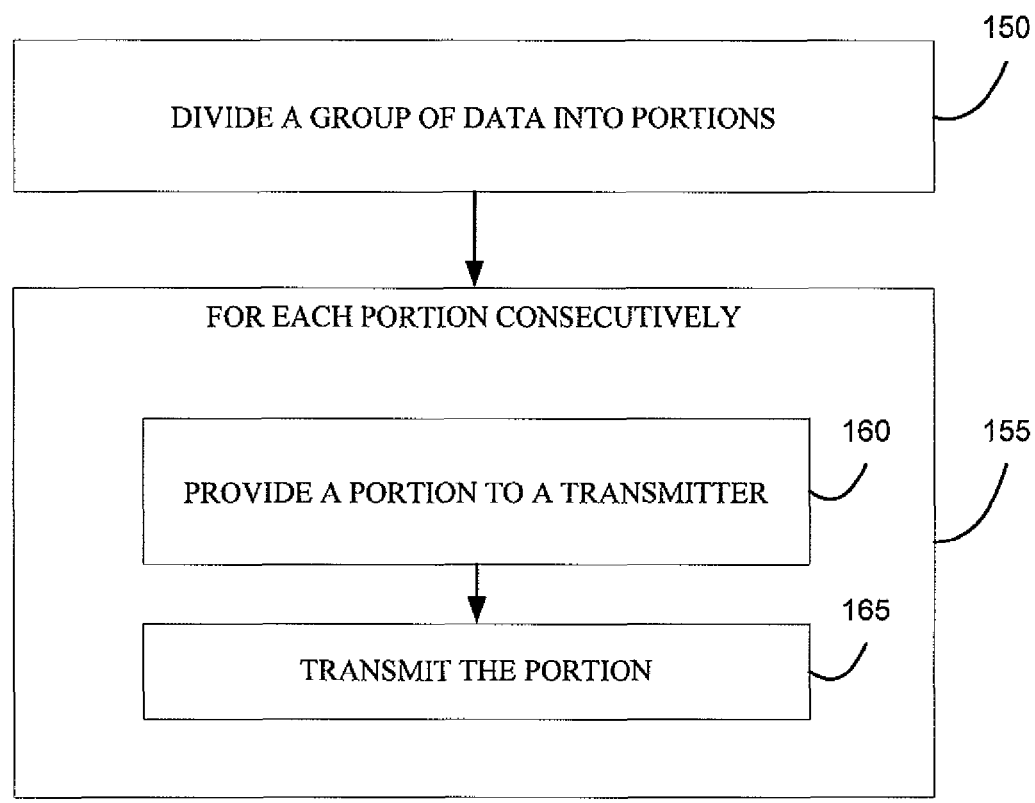
FIG. 2A is a simplified flowchart illustration of a method for transmitting data operative in accordance with a preferred embodiment of the present invention.

Reference is now made to FIG. 2A, which is a simplified flowchart illustration of a method for transmitting data operative in accordance with a preferred embodiment of the present invention.

Data, in digital form, arrives at the first node. The data typically arrives packaged in groups of data.

The first node divides the data into a plurality of portions (step 150). Each one of the portions, in consecutive order (step 155), is provided to one of several transmitters connected to the several parallel links (step 160). Typically, each of the transmitters receives more than one portion of the data. The portions which are provided to one transmitter, grouped together, are termed herein frames. It is to be appreciated that within each frame, the relative order of the portions remains the same as in the original data.

The first node transmits the frames through the transmitters (step 165). Each frame is transmitted through the transmitter connected to the link the frame is apportioned to. For example, for a case of two links, and two transmitters, the data is divided into two frames, one for each transmitter, and each transmitter transmits one frame.

Several receivers at the second node receive the transmitted frames, and the second node reassembles the data.

Figure 2B:
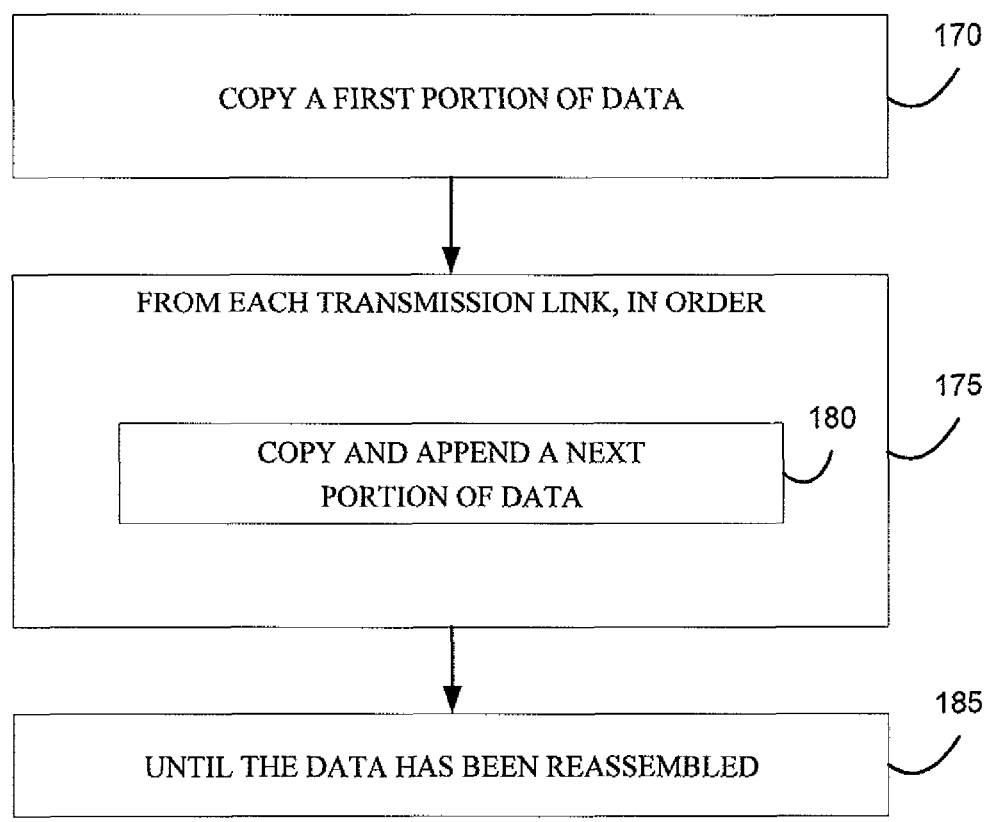
FIG. 2B is a simplified flowchart illustration of a method for receiving data operative in accordance with a preferred embodiment of the present invention.

Reference is now made to FIG. 2B, which is a simplified flowchart illustration of a method for receiving data operative in accordance with a preferred embodiment of the present invention.

The reassembly is performed by copying a first portion of the data from a first receiver, according to the consecutive order mentioned above with reference to step 155 (step 170), producing partially reassembled data. Following that, from each of the receivers (step 175), a next portion of the data according to the above-mentioned order is copied, and appended to the partially reassembled data (step 180). The copying and appending, in order, is continued until the data has been reassembled (step 185).

The data is typically divided into portions at a fixed granularity, by way of a non-limiting example, byte sized granularity.

Of the data, a first portion is provided to a first link, a following portion is apportioned to either the first link, or to another link, and so on, until all the portions of the data have been provided. Which portion is apportioned to which link is determined by an apportioning plan associated with the link.

The total amount of data apportioned to each frame is dynamic, preferably changing according to a capacity of the link which transmits the frame. Since capacity may change over time, the apportioning plan can change over time, and the data can be apportioned differently, without losing any data, that is, in an errorless fashion.

Each frame contains an indication of how data was apportioned to it. Based on the indication in each frame, the second node reassembles the data in the original order of the data at the first node.

Figure 3A:
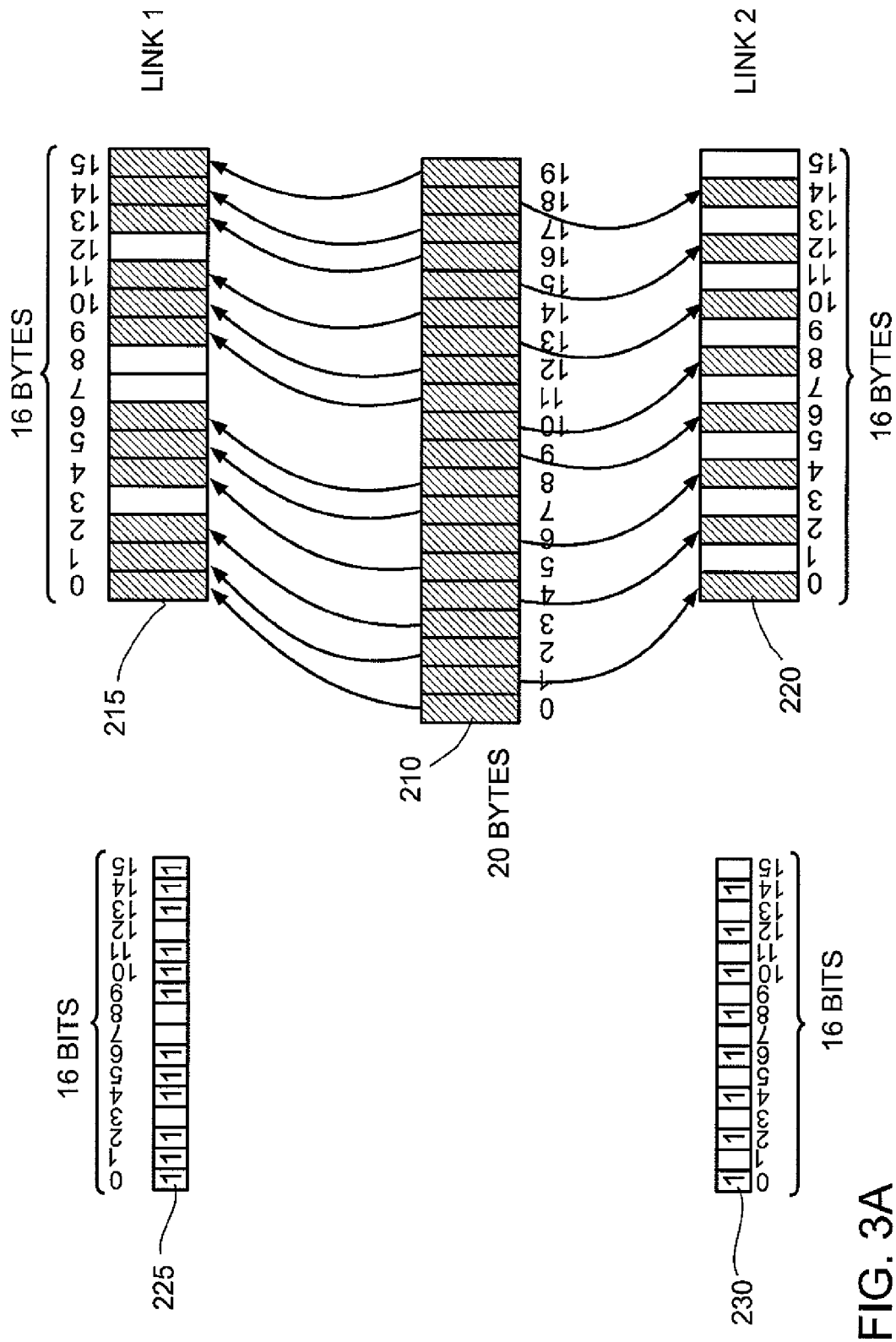
FIG. 3A is a simplified illustration of apportioning bytes of data to two data frames, according to two apportioning plans, operative in accordance with a preferred embodiment of the present invention.

Reference is now made to FIG. 3A, which is a simplified illustration of apportioning bytes of data to two data frames, according to two apportioning plans, operative in accordance with a preferred embodiment of the present invention.

At a first node, also termed herein an ingress node, data 210 comprising 20 bytes, is to be apportioned between a first frame 215 and a second frame 220. The size of the first frame 215 and the second frame 220 is 16 bytes each. Neither of the frames are enough to contain the entire data 210, but together they are enough.

The data is apportioned to the data frames so that the first frame 215 contains only 12 bytes of a total of 16 bytes maximally possible, due to a known bandwidth limitation of the link destined to transmit the first data frame 215. The 12 bytes are to be distributed within the 16 byte first frame 215 according to a first apportioning plan 225. A typical apportioning plan, in terms used in Adaptive Code Modulation (ACM), defines an ACM constellation for its respective transmission link. The first apportioning plan 225 is represented in this example as a 16 bit bitmap, with values of 1 corresponding to bytes of transmitted data, and values of 0 corresponding to bytes of space, or null data.

The second frame 220 is to transmit only 8 bytes of the 16 bytes maximally possible, according to a second apportioning plan 230 similarly to the description above with reference to the first frame 215.

It is to be appreciated that in the example above, two transmission links, each with a maximum capacity of 16 bytes, are being used to transmit 20 bytes. In fact, each of the transmission links is being used at a capacity diminished from its maximum capacity, the first transmission link being used to transmit 12 bytes, and the second transmission link being used to transmit 8 bytes, based on their actual capacity.

A method of apportioning bytes from the data 210 according to the first apportioning plan 225 and the second apportioning plan will now be described.

A first bit in the first apportioning plan 225 is consulted. Since the value of the first bit is 1, a byte of data is provided from the data 210 and stored as a first byte in a buffer containing the first frame 215. Next, a first bit in the second apportioning plan 230 is consulted. Since the value of the first bit is 1, a byte of data is provided from the data 210 and stored as a first byte in a buffer containing the second frame 220.

Next, a second bit in the first apportioning plan 225 is consulted. Since the value of the second bit is 1, a byte of data is provided from the data 210 and stored as a second byte in the first buffer containing the first frame 215. Next, a second bit in the second apportioning plan 230 is consulted. Since the value of the second bit is 0, no data is provided from the data 210, and no data is stored in a second byte in the second buffer containing the second frame 220.

The method of apportioning comprises therefore of consulting bits of increasing order in the first apportioning plan 225 and the second apportioning plan 230. When a value of 1 is read from the respective apportioning plan, a byte of data, of increasing order, from the data 210, is provided, to be stored in a buffer containing a respective frame, and a pointer within the data 210 is advanced by one byte. When a value of 0 is read from the respective apportioning plan, no data is provided to the buffer containing the respective frame, and the pointer is not advanced.

In an embodiment of the present invention, the buffers containing the first frame 215 and the second frame 220 are First-In-First-Out (FIFO) buffers.

The first frame 215 and the second frame 220 are sent from the first, ingress node, to a second node, also termed herein an egress node.

It is to be appreciated that the above description applies to a case where the first apportioning plan 225 and the second apportioning plan 230 have the same rate of transmission, and therefore the plans are consulted substantially alternately.

In an alternative embodiment of the present invention, the first apportioning plan 225 and the second apportioning plan 230 have different rates of transmission, and the apportioning plans are consulted at different rates. For example, when the first apportioning plan 225 has a transmission rate double the second apportioning plan 230, the first apportioning plan 225 is consulted two times for every time the second apportioning plan 230 is consulted. Correspondingly, the first apportioning plan 225 can provide up to two bytes to the first frame 215 before the second apportioning plan 230 can provide up to one byte to the second frame 220.

It is to be appreciated that the data 210 can be any suitable amount of data. Typically, the data 210 is a block of data according to some standard, such as, for example, an Ethernet data packet.

It is to be appreciated that the granularity of apportioning the data 210 can be any granularity. A typical granularity is a byte, since so many electronic systems use a byte as a basic unit. Other granularities can be, for example, a bit, a 4-bit nibble, a 16-bit word, a 32-bit word, a 64 bit word, and integer numbers of basic data units such as the byte.

It is to be appreciated that the size, that is, the number of bytes, of the first frame 215 and the second frame 220 do not have to be equal. If one of the frames ends before the other ends, data is provided to the other frame according to the apportioning plan of the other frame. It is to be appreciated that together, both apportioning plans should contain enough data to enable apportioning the data 210.

It is to be appreciated that the apportioning described in FIG. 3A for two parallel links can be extended to a greater number of parallel links. Each parallel link is associated with a frame for transmitting data, and with an apportioning plan for determining when a portion of data is to be stored in the frame. Each of the frames stores or does not store a portion of data, according to its associated apportioning plan.

It is to be appreciated that data from sources other than the data 210 is typically added to the first frame 215 and the second frame 220. Such data can be, for example, an indication of which apportioning plan was used to produce each frame, a marker for a beginning of the frame, a marker for an end of the frame, and so on. The additional data is typically stored in a different portion of the frames than the data from the data 210.

It is to be appreciated that additional data can be any data, including, by way of example, Time Division Multiplexed (TDM) data, PDH data such as E1/T1 data, SDH (Synchronous Digital Hierarchy) data such as SONET (Synchronous Optical NETwork) data, and also Ethernet data such as described above as being split between the first frame 215 and the second frame 220. The additional data is not split using the above mechanism, but can be split using any splitting scheme, such as a second mechanism similar to the above described mechanism, splitting using other mechanisms, and not splitting the data at all.

When the additional data is TDM data, some embodiments of the present invention use a splitting scheme such that both the first frame 215 and the second frame 220 each comprise data from all time slots of the TDM data. Other embodiments of the present invention use a splitting scheme such that the first frame 215 comprises data from some time slots, and the second frame 220 comprises data from other time slots. Still other embodiments of the present invention use a splitting scheme such that the first frame 215 comprises data from some time slots, and the second frame 220 comprises data from some other time slots and from some time slots overlapping the time slots in the first frame 215. When the additional data is recombined, the TDM data is recombined such that passing through a system constructed and operative in accordance with embodiments of the present invention does not affect the division of data among the time slots.

When the additional data is SDH data or SONET data, such as, for example, digital telephone transmissions, some embodiments of the present invention use a splitting scheme such that both the first frame 215 and the second frame 220 each comprise data from all telephone calls. Other embodiments of the present invention use a splitting scheme such that the first frame 215 comprises data from some telephone calls, and the second frame 220 comprises data from other telephone calls. Still other embodiments of the present invention use a splitting scheme such that the first frame 215 comprises data from some telephone calls, and the second frame 220 comprises data from some other telephone calls and from some telephone calls overlapping the telephone calls in the first frame 215. When the additional data is recombined, the SDH data or SONET data is recombined such that passing through a system constructed and operative in accordance with embodiments of the present invention does not affect the synchronicity of the SDH data.

When the additional data is PDH data, such as E1/T1 data frames, some embodiments of the present invention use a splitting scheme such that both the first frame 215 and the second frame 220 each comprise data from all E1/T1 data frames. Other embodiments of the present invention use a splitting scheme such that the first frame 215 comprises data from some E1/T1 data frames, and the second frame 220 comprises data from other E1/T1 data frames. Still other embodiments of the present invention use a splitting scheme such that the first frame 215 comprises data from some E1/T1 data frames, and the second frame 220 comprises data from some other E1/T1 data frames and from some E1/T1 data frames overlapping the E1/T1 data frames in the first frame 215. When the additional data is recombined, the PDH data is recombined such that passing through a system constructed and operative in accordance with embodiments of the present invention does not affect the PDH data, for example does not affect the E1/T1 data frames.

In an alternative embodiment of the present invention the first frame 215 and the second frame 220 comprise an indication of which apportioning plan was used to produce each frame. For example, if 20 apportioning plans can be used and are associated with the first frame 215, the first frame 215 can comprise a number between 1 and 20 to indicate to a receiving unit which apportioning plan was used to produce the first frame 215. Likewise, if 30 apportioning plans can be used and are associated with the second frame 220, and the second frame 220 can comprise a number between 1 and 30 to indicate to a receiving unit which apportioning plan was used to produce the second frame 220. The apportioning plans of the first frame 215 and the second frame 220 do not have to be equal.

The receiving unit has the same apportioning plans as a corresponding transmitting unit, and uses the indication number to determine which apportioning plan to use for reassembling the data.

It is to be appreciated that an apportioning plan used for a radio link can and does change over time, corresponding to changes in the quality of the radio link. The indications described above can change between groups of data transmitted over the parallel links.

Figure 3B:
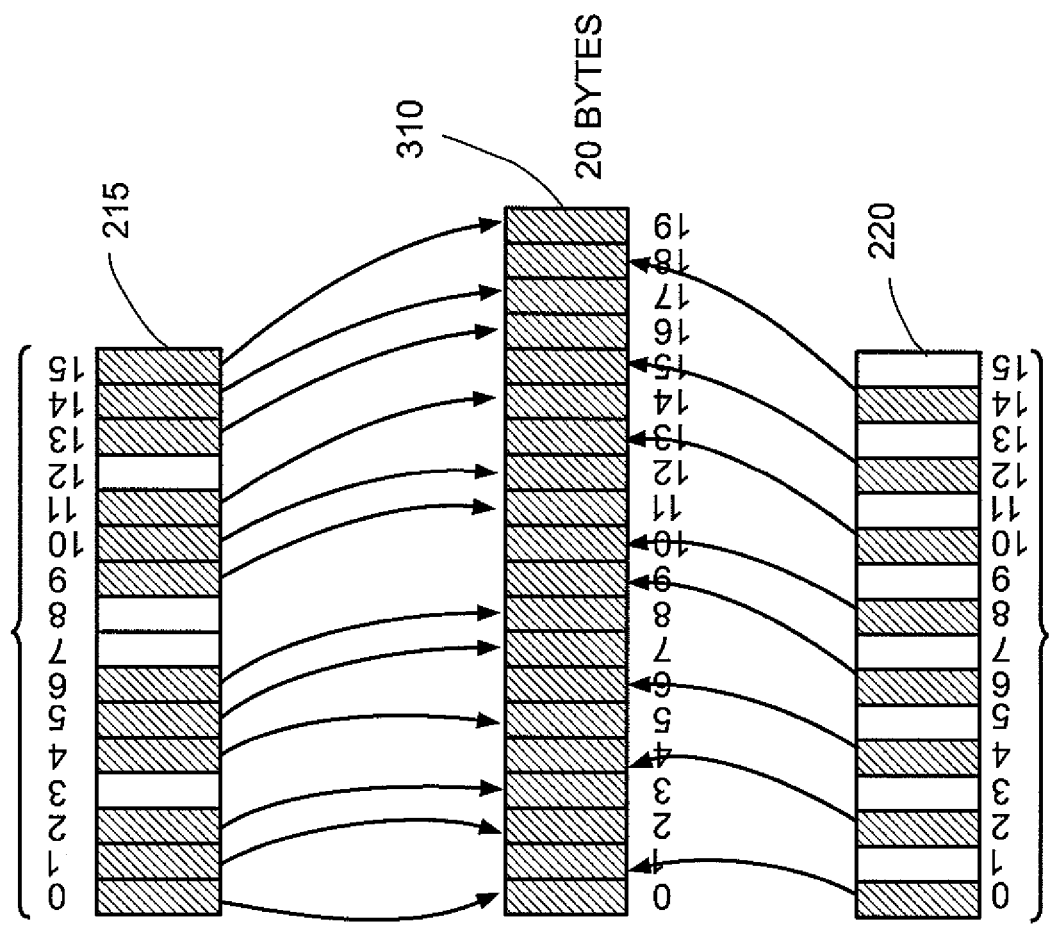
FIG. 3B is a simplified illustration of reassembling data from two data frames, according to two apportioning plans, operative in accordance with a preferred embodiment of the present invention.
Figure 3B:
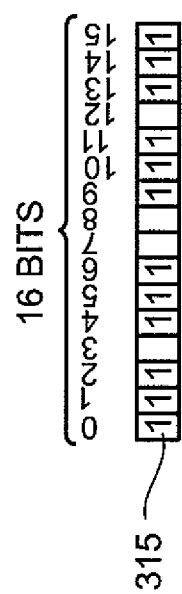
Figure 3B:
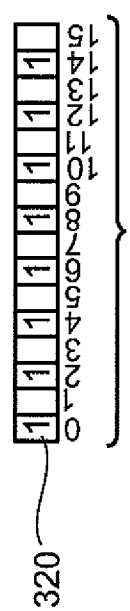

Reference is now made to FIG. 3B, which is a simplified illustration of reassembling data from two data frames according to two apportioning plans operative in accordance with a preferred embodiment of the present invention.

The first frame 215 and the second frame 220 are received at the egress node. A method of reassembling bytes from the first frame 215 and the second frame 220 into data 310 will now be described.

A first apportioning plan 315 and a second apportioning plan 320 are determined. Alternative methods for determining the first apportioning plan 315 and the second apportioning plan 320 can be used. For example, one method of determining the first apportioning plan 315 and the second apportioning plan 320 can be having a fixed first apportioning plan 315 for a first radio link, and a fixed second apportioning plan 320 for a second radio link. A second method can be reading an identifier of the first apportioning plan 315 and an identifier of the second apportioning plan 320 from additional data comprised in the respective first and second frames. A third method can be reading an entire first apportioning plan 315 and an entire second apportioning plan 320 from the additional data comprised in the respective first and second frames.

It is to be appreciated that the first apportioning plan 315 is preferably substantially equal to the first apportioning plan 225 of FIG. 3A, and the second apportioning plan 320 is preferably substantially equal to the second apportioning plan 230 of FIG. 3A.

A first bit in the first apportioning plan 315 is consulted. Since the value of the first bit is 1, a first byte of data from the first frame 215 is copied to be a first byte of the data 310. Next, a first bit in the second apportioning plan 320 is consulted. Since the value of the first bit is 1, a first byte of data stored in the second frame 220 is copied to be a second byte of the data 310.

Next, a second bit in the first apportioning plan 315 is consulted. Since the value of the second bit is 1, a second byte of data from the first frame 215 is copied to be a third byte in the data 310. Next, a second bit in the second apportioning plan 320 is consulted. Since the value of the second bit is 0, a second byte is not copied from the second frame 220. It is to be appreciated that the second byte of the second frame 220 does not contain data from the data 210 of FIG. 2, according to the second apportioning plan 320.

The method of apportioning comprises therefore of consulting bits of increasing order in the first apportioning plan 315 and the second apportioning plan 320, and, according to values of 1 or 0 stored in the apportioning plans, copying or not copying bytes of data of increasing order from first frame 215 and the second frame 220 respectively, and when copying the bytes, storing the bytes in increasing order in the data 310.

It is to be appreciated that the bytes of data reassembled in the data 310 are reassembled in the same order in which they were in the data 210 of FIG. 3A.

It is to be appreciated that the above description applies to a case where the first apportioning plan 315 and the second apportioning plan 320 have the same rate of transmission, and therefore the plans are consulted substantially alternately.

In an alternative embodiment of the present invention, the first apportioning plan 315 and the second apportioning plan 320 have different rates of transmission, and the apportioning plans are consulted at different rates. For example, when the first apportioning plan 315 has a transmission rate double the second apportioning plan 320, the first apportioning plan 315 is consulted two times for every time the second apportioning plan 320 is consulted. Correspondingly, up to two bytes from the first frame 215 can be copied before copying up to one byte from the second frame 220.

It is to be appreciated that the data 310 can be any sized block of data, as described above with reference to FIG. 3A.

It is to be appreciated that the granularity of data from the first frame 215 and the second frame 220 can be any granularity, as described above with reference to FIG. 3A.

It is to be appreciated that the size, that is, the number of bytes, of the first frame 215 and the second frame 220 do not have to be equal. If one of the frames ends before another ends, data is copied and stored from the other frame according to the apportioning plan of the other frame.

It is to be appreciated that the reassembling described in FIG. 3B for two parallel links can be extended to a greater number of parallel links, similarly to the apportioning described above with reference to FIG. 3A.

It is to be appreciated that additional data which may have been added to the first frame 215 and the second frame 220, as described above with reference to FIG. 3A, can be extracted during reassembly. The additional data may be used in determining which apportioning plan to associate with each frame.

Figure 4:
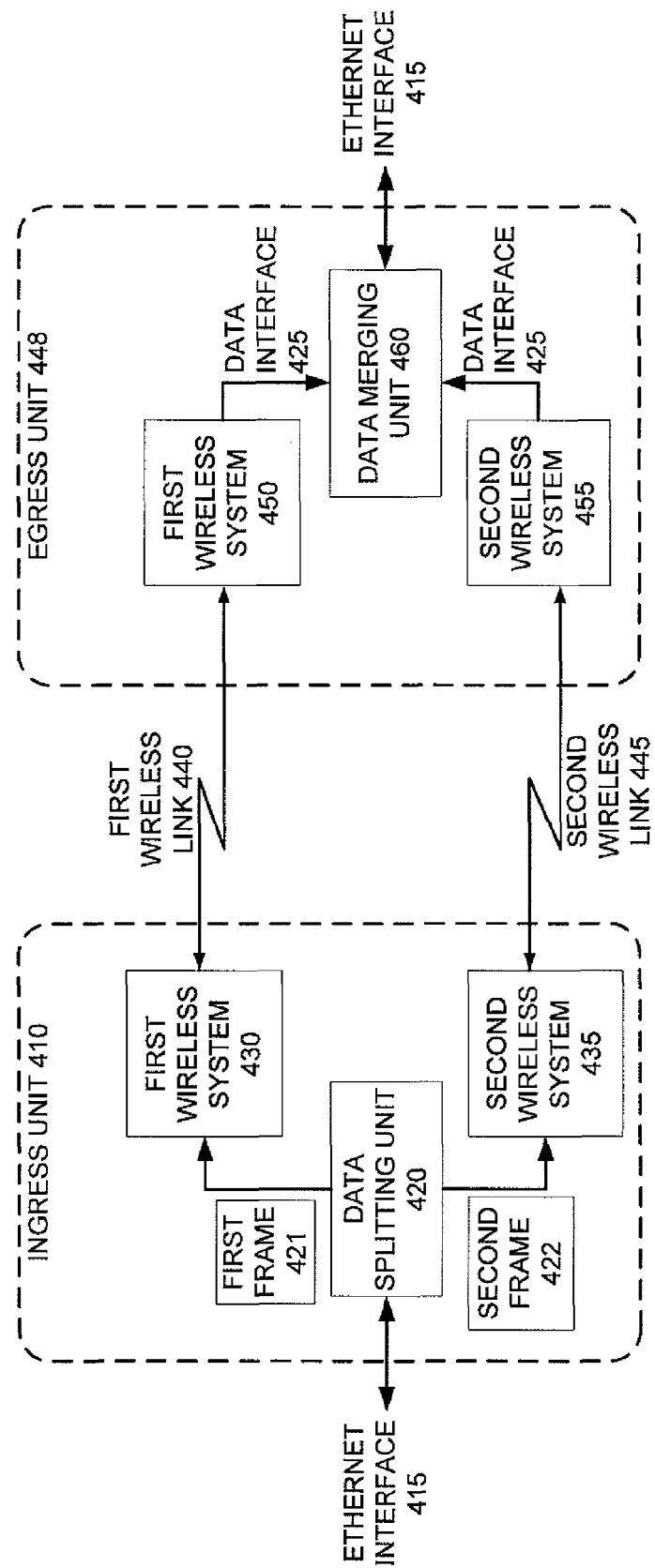
FIG. 4 is a simplified block diagram illustration of a system constructed and operative in accordance with a preferred embodiment of the present invention.

Reference is now made to FIG. 4, which is a simplified block diagram illustration of a system constructed and operative in accordance with a preferred embodiment of the present invention.

An ingress unit 410 receives Ethernet data packets through an Ethernet interface 415. The ingress unit 410 comprises a splitting unit 420, which splits the Ethernet data packets into a first frame 421 and a second frame 422, and sends the frames to a first wireless system 430 and a second wireless system 435 respectively.

The frames are sent via a first wireless link 440 and a second wireless link 445 respectively, to an egress unit 448, comprising a first wireless system 450 and a second wireless system 455. The first wireless system 450 and the second wireless system 455 each receive the first frame 421 and the second frame 422 respectively. The first wireless system 450 and the second wireless system 455 send the first frame 421 and the second frame 422 to a data merging unit 460. The data merging unit 460 reassembles the Ethernet data packets, and sends them out over an Ethernet interface 415.

The operation of the splitting unit 420 and the data merging unit 460 are as explained above with reference to FIGS. 2 and 3 respectively.

Some embodiments of the present invention comprise a mechanism for keeping a constant delay for data, from ingress of the data into the ingress unit 410 to egress of the data from egress unit 448.

The constant delay is optionally maintained as described in more detail in co-assigned, and partially co-invented, U.S. Provisional Patent Application No. 60/960,289 of Yakov, filed on 24 Sep. 2007, the contents of which are hereby incorporated by reference. Briefly, the constant delay is optionally maintained by ensuring that data exiting the data merging unit 460 exits at the same rate as that same data when it entered the splitting unit 420. Thus, even if data rates change, a constant delay is maintained.

Some embodiments of the present invention comprise a mechanism for maintaining errorless and hitless communication even when capacity of one or more of the parallel transmission links, such, for example, capacity of the first wireless link 440 and/or capacity of the second wireless link 445, changes.

The errorless and hitless communication is optionally maintained as described in more detail in co-assigned U.S. Provisional Patent Application No. 60/960,288 of Vanunu, filed on 24 Sep. 2007, the contents of which are hereby incorporated by reference. If a need arises to drop data from the transmission link comprising the first wireless link 440 and the second wireless link 445, the data is dropped according to an orderly fallback procedure, and data marked as do-not-drop does not get dropped. Data which is transmitted through the transmission link comprising the first wireless link 440 and the second wireless link 445 is transmitted in a errorless and hitless fashion.

Figure 5:
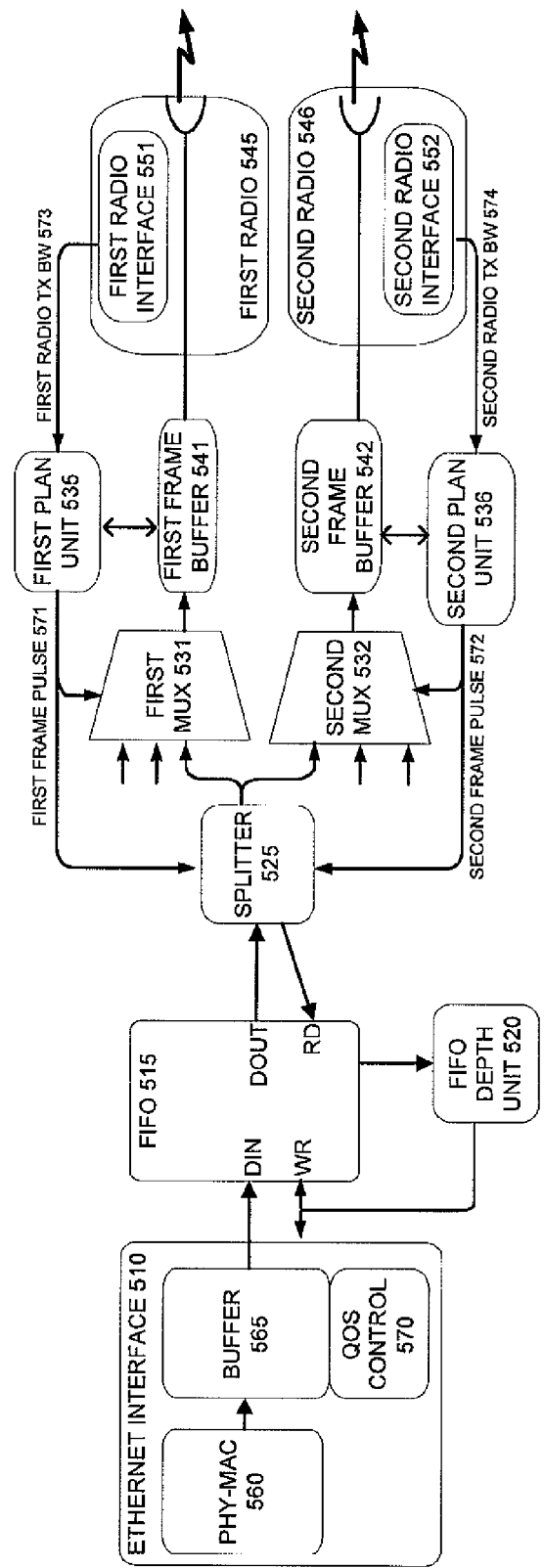
FIG. 5 is a simplified block diagram illustration of a transmitter constructed and operative in accordance with the system of FIG. 4.

Reference is now made to FIG. 5, which is a simplified block diagram illustration of a transmitter constructed and operative in accordance with the system of FIG. 4.

The transmitter of FIG. 5 comprises an Ethernet interface 510, a FIFO 515, a FIFO depth unit 520, a splitter 525, a first mux 531, a second mux 532, a first plan unit 535, a second plan unit 536, a first frame buffer 541, a second frame buffer 542, a first radio 545, a second radio 546, a first radio interface 551, and a second radio interface 552.

The Ethernet interface 510 comprises a PHY-MAC interface 560, a buffer 565, and a QoS (Quality of Service) control 570.

The operation of the transmitter of FIG. 5, which follows the description provided above with reference to FIG. 3A, will now be described.

The PHY-MAC interface 560 receives Ethernet data packets from some source (not shown). The PHY-MAC interface 560 is connected to the buffer 565, and transfers the Ethernet data packets for storage in the buffer 565. The buffer 565 can accept Ethernet data packets at rates based, at least partly, on typical Ethernet data rates. The QoS control 570 is connected to the buffer 565, and manages Ethernet data packets within the buffer with respect to quality of service, as is known in the art. Ethernet data packets stored in the buffer 565 are transferred according to QoS order, in byte sized blocks, to the FIFO 515. The transfer is performed in response to a request signal arriving from the FIFO depth unit 520.

The FIFO 515 is a first-in-first-out buffer, which stores a number of bytes of data, the number being controlled by the FIFO depth unit 520. When the number of bytes of data in the FIFO 515 falls below a specified number, the FIFO depth unit 520 produces a write pulse to the radio rate FIFO 515, and a signal to the Ethernet interface 510. The signal instructs the Ethernet interface 510 to provide a byte of data to the FIFO 515.

It is to be appreciated that the FIFO 515 requests data from the buffer 565, and provides data to the splitter 525, at rates based, at least partly, on data rates of the first radio 545 and the second radio 546.

It is to be appreciated that a connection between the buffer 565 and the FIFO 515 can be 8 bits wide, 16 bits wide, 32 bits wide, or other widths, according to components used in a design of the receiver. The number of bytes provided by the buffer 565 to the FIFO 515 in response to a single data request can take up a full width of the connection, such that, for example, with a 32 bit wide connection, four bytes can be provided in response to each data request from the FIFO 515.

The FIFO 515 is bi-directionally connected to the splitter 525, and provides a byte of data to the splitter 525, each time the splitter 525 sends a read request to the FIFO 515.

The splitter 525 sends a read request to the FIFO 515 when it receives a first frame pulse 571 from the first plan unit 535 or a second frame pulse 572 from the second plan unit 536. The plan units provide a frame pulse according to values in apportioning plans as described above with reference to the first apportioning plan 225 and the second apportioning plan 230 of FIG. 3A.

It is to be appreciated that the splitter 525 sends read requests to the FIFO 515 such that the splitter has two bytes of data available for providing to the first mux 531 and to the second mux 532. Thus the splitter 525 can receive a first frame pulse 571 from the first plan unit 535 and a second frame pulse 572 from the second plan unit 536 simultaneously and provide both muxes 531 532 with data.

It is to be appreciated that the connection between the splitter 525 and the FIFO 515 can be 8 bits wide, 16 bits wide, 32 bits wide, or other widths, according to components used in a design of the receiver. The number of bytes provided by the FIFO 515 to the splitter 525 in response to a single read request can take up a full width of the connection, such that, for example, with a 16 bit wide connection, two bytes can be provided in response to each data request from the splitter 525.

It is to be appreciated that the first plan unit 535 and the second plan unit 536 can comprise many apportioning plans. The different apportioning plans correspond to different frame types, and it is to be appreciated that even a single frame type can have more than one corresponding apportioning plan, as described above with reference to FIG. 3A.

It is to be appreciated that different frame lengths are produced on the fly, according to frame pulses provided by the plan units based, at least partly, on the apportioning plans.

The plan units also send the frame pulses to the first mux 531 and the second mux 532 respectively. The frame pulses are signals to the muxes to receive a byte of data from the splitter 525, and to transfer the byte of data to the first frame buffer 541 and the second frame buffer 542 respectively.

The first mux 531 and the second mux 532 also receive additional inputs from additional sources, such as, for example, control data, synchronization data, management data, PDH E1/T1 data, and so on. It is to be appreciated that data from the additional inputs is typically stored in separate portions of the frame than data which has been split among frames as describes above with reference to FIG. 3A.

The frame buffers 541 542 store data for transmission. Contents of the frame buffers 541 542 are sent to the first radio 545 and the second radio 546 respectively, and transmitted wirelessly to complementary radio receivers at an egress node of the transmission link.

It is to be appreciated that the frame buffers 541 542 do not have to be complete before transmission starts. The transmission is not based on a store-and-forward concept relating to complete buffers. When a substantial amount of data is transferred into the frame buffers 541 542, the frame buffers 541 542 transfer the data to the first radio 545 and the second radio 546 respectively. The frame buffers 541 542 typically operate in First-In-First-Out fashion.

The first radio 545 and the second radio 546 each have associated with them the first radio interface 551 and the second radio interface 552 respectively. The radio interfaces provide a first radio transmission bandwidth 573 and a second radio transmission bandwidth 574. The apportioning plans associated with each of the first plan unit 535 and the second plan unit 536, are based, at least partly, on the bandwidth provided by the first radio interface 551 and the second radio interface 552 respectively.

It is to be appreciated that for wireless transmissions using Adaptive Code Modulation (ACM), the apportioning plan is typically a modulation constellation. The modulation constellation is chosen from a number of candidate constellations according to the transmission bandwidth of the respective first radio 545 or second radio 546.

In an alternative embodiment of the present invention, the transmitter adds an indication identifying the modulation constellation used for each frame. The indication is preferably added as additional input to the first mux 531 and the second mux 532 respectively.

It is to be appreciated that in wireless transmissions, bandwidth can change over time. Some of the change is caused by changing levels of noise.

In yet another alternative embodiment of the present invention, the transmitter changes apportioning plans to suit changing bandwidth of each radio.

It is to be appreciated that more than two sets of parallel muxes, frame buffers, plan units, radios, and radio interfaces can be used in the transmitter of FIG. 5. The apportioning proceeds among the sets as described above with reference to FIG. 3A.

In an alternative embodiment of the present invention the first plan unit 535 and the second plan unit 536 are combined in one plan unit (not shown). The one plan unit receives the first radio transmission bandwidth 573 and the second radio transmission bandwidth 574 as inputs. The one plan unit comprises two apportioning plans substantially equal to the apportioning plans of the first plan unit 535 and the second plan unit 536, and provides signals substantially identical to the first frame pulse 571 and the second frame pulse 572.

It is to be appreciated that the one plan unit can replace more than two plan units.

Figure 6:
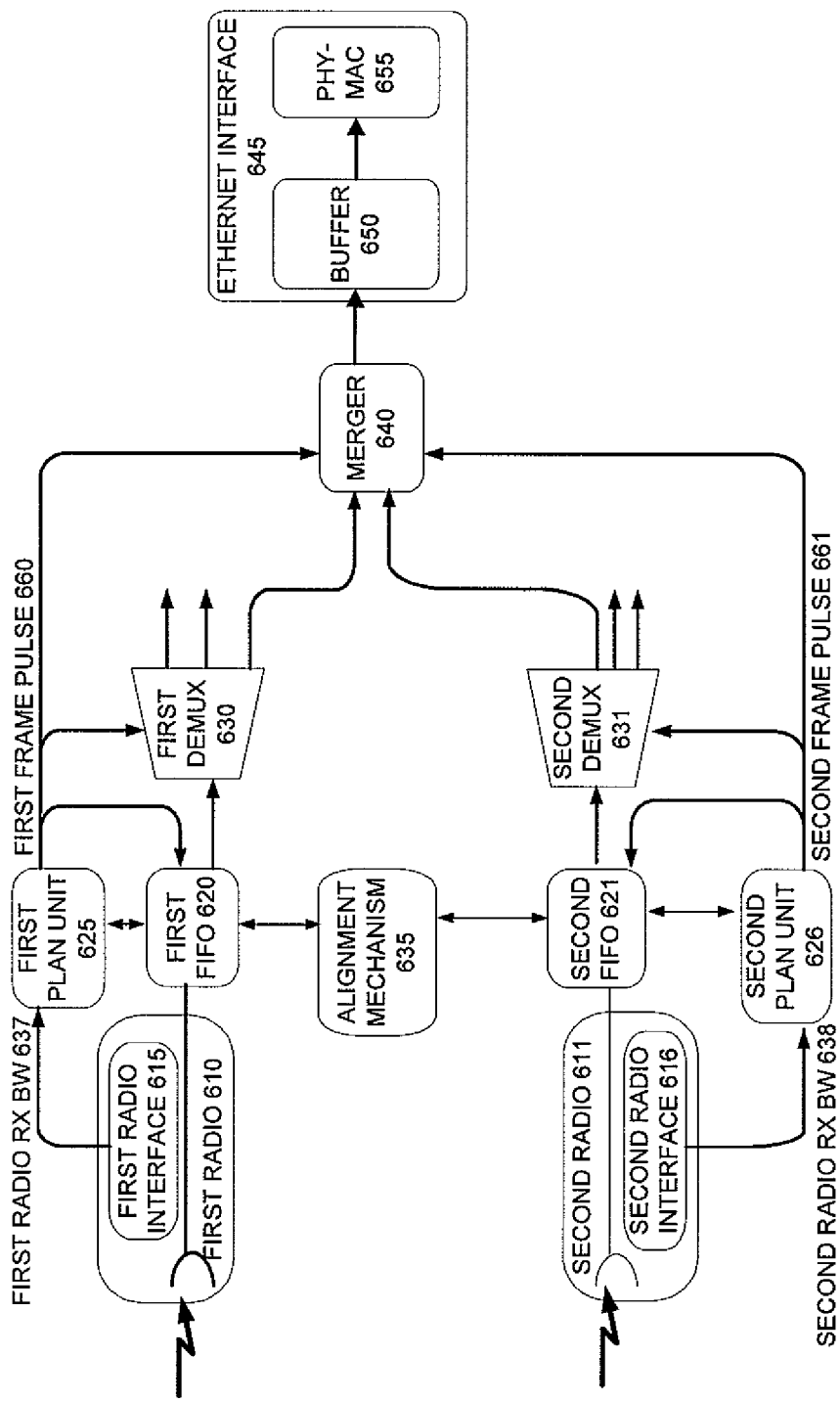
FIG. 6 is a simplified block diagram illustration of a receiver constructed and operative in accordance with the system of FIG. 4.

Reference is now made to FIG. 6, which is a simplified block diagram illustration of a receiver constructed and operative in accordance with the system of FIG. 4.

The receiver of FIG. 6 comprises a first radio 610, a second radio 611, a first radio interface 615, a second radio interface 616, a first FIFO 620, a second FIFO 621, a first plan unit 625, a second plan unit 626, a first demultiplexer (demux) 630, a second demultiplexer (demux) 631, an alignment mechanism 635, a merger 640, and an Ethernet interface 645. The Ethernet interface 645 comprises a buffer 650 and a PHY-MAC interface 655.

The first radio 610 receives transmissions from the corresponding first radio 545 in a transmitter, as described above with reference to FIG. 5, and the second radio 611 receives transmissions from a corresponding second radio 546. The transmissions comprise a first data frame, received by the first radio 610 and transferred to the first FIFO 620, and a second data frame, received by the second radio 611, and transferred to the second FIFO 621.

The alignment mechanism 635 ensures that the first data frame in the first FIFO 620 and the second data frame in the second FIFO 621 are aligned. Each data frame comprises a start-of-data-frame marker by which the alignment is done. The alignment mechanism 635 aligns the first data frame and the second data frame by producing a first pointer to an address in the first FIFO 620 containing a beginning of the first data frame, and a second pointer to an address in the second FIFO 621 containing a beginning of the second data frame.

As described above with reference to FIG. 3B, the first plan unit 625 and the second plan unit 626 provide, or do not provide, a first frame pulse 660 to the first FIFO 620, and a second frame pulse 661 to the second FIFO 621 according to their respective apportioning plans. The frame pulses instruct the FIFOs to send a byte of data through the first demux 630 and the second demux 631 respectively, and into the merger 640.

The pulse signals are provided according to the apportioning plans. For example, initially the first frame pulse 660 is provided to the first FIFO 620, to the first demux 630, and to the merger 640. Next, the second frame pulse 661 is provided to the second FIFO 621, to the second demux 631, and to the merger 640. The signals are provided according to a first apportioning plan and a second apportioning plan respectively, as described above with reference to FIG. 3B.

It is to be appreciated that the merger 640 can receive the first frame pulse 660 and the second frame pulse 661 simultaneously, and is therefore able to receive two bytes simultaneously, one from each of the first demux 630 and the second demux 631.

It is to be appreciated that the first plan unit 625 and the second plan unit 626 can comprise many apportioning plans, corresponding to different frame types, as described above with reference to FIGS. 3A and 3B.

In an embodiment of the present invention, the first and the second apportioning plan are determined by the first plan unit 625 and the second plan unit 626, based, at least in part, on the first radio interface 615 and the second radio interface 616 sending a first radio receiving bandwidth 637 and a second radio receiving bandwidth 638 respectively.

It is to be appreciated that the apportioning plans can be determined explicitly and implicitly. An apportioning plan is determined explicitly by reading a specific indication of the apportioning plan from additional data stored in the frame. An apportioning plan is determined implicitly by having a correspondence between bandwidth data provided by the radio interfaces and available apportioning plans, and having the first plan unit 625 and the second plan unit 626 each select an apportioning plan corresponding to the bandwidth data provided by the radio interfaces.

The first radio interface 615 and the second radio interface 616 extract information from received data frames. The information typically includes such information as a size of framing data, size of a frame portion containing data split as described above with reference to FIG. 3A, and apportioning plan information.

The merger 640 receives signal pulses from the first plan unit 625 and the second plan unit 626, and bytes of data from the first demux 630 and from the second demux 631. The bytes of data are received by the merger 640 in the same order as they were in the FIFO 515 of FIG. 5.

The merger 640 sends the bytes of data to the buffer 650 comprised in the Ethernet interface 645. The buffer 650 stores the bytes of data, and eventually transfers the stored data, as Ethernet data packets, to the PHY-MAC interface 655, and on, according to Ethernet protocols and Ethernet data rates.

It is to be appreciated that the merger 640 can send bytes of data to the buffer 650 as soon as they arrive, or the merger 640 can act as a buffer, collecting several bytes of data before sending the data to the buffer 650. For example, a connection between the merger 640 and the buffer can be 8 bits wide, 16 bits wide, 32 bits wide, or other widths, according to components used in a design of the receiver.

In a preferred embodiment of the present invention the buffer 650 comprises an off-the-shelf buffer with a 32 bit wide input. The merger 640 sends 4 bytes at a time to the buffer 650. Persons skilled in the art will appreciate that using an off-the-shelf buffer 650 lowers the cost of the receiver.

The first demux 630 and the second demux 631 extract additional data from the data frames, as described above with reference to the muxes 531 532 of FIG. 5, and provide the additional data to suitable units in the receiver of FIG. 6. The additional data typically includes control data, and apportioning plan data. The additional data can any data, including, by way of example, PDH data such as E1/T1 data frames, and also Ethernet data which was not split between the first frame 215 and the second frame 220 as described above with reference to FIGS. 3A and 5.

In an alternative embodiment of the present invention the receiver extracts an indication identifying the modulation constellation used by the transmitter for each frame, and uses corresponding apportioning plans for reassembling the data. The indication is preferably extracted as part of the additional data which the first demux 630 and the second demux 631 extract from the data frames.

It is to be appreciated that more than two sets of parallel muxes, frame tables, frames, radios, and radio interfaces can be used in the receiver of FIG. 6. The reassembling proceeds in a round robin fashion among the sets, as described above with reference to FIG. 3B.

In an alternative embodiment of the present invention the first plan unit 625 and the second plan unit 626 are combined in one plan unit (not shown). The one plan unit receives the first radio transmission bandwidth 637 and the second radio transmission bandwidth 638 as inputs. The one plan unit comprises two apportioning plans substantially equal to the apportioning plans of the first plan unit 625 and the second plan unit 626, and provides signals substantially identical to the first frame pulse 660 and the second frame pulse 661.

It is to be appreciated that the one plan unit can replace more than two plan units.

It is expected that during the life of this patent many relevant devices and systems will be developed and the scope of the terms herein, particularly of the terms Ethernet, data packet, frame, Adaptive Code Modulation (ACM), Adaptive Modulation and Coding (AMC), constellation, radio, wireless, point to point, ingress, egress, and broadband, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of transmitting data over a plurality of parallel transmission links, comprising:
    using, at a given instant, a plurality of apportioning plans;
    associating, at the given instant, each one of the plurality of the apportioning plans with a respective one of the plurality of parallel transmission links;
    dividing the data into a plurality of portions; and
    for each one of the portions of the data, in a consecutive order of the portions of the data:
    providing the portion of the data to a respective one of the transmission links, in round robin order, based on the transmission link's associated apportioning plan; and
    sending the portion of the data over the transmission link connected to the transmitter,
    wherein each one of the apportioning plans is independent of addressing information associated with the portion of the data.

2. The method according to claim 1 wherein the providing further comprises receiving a request from the transmitter for the portion of the data.

3. The method according to claim 1 wherein the apportioning plan associated with the transmission link comprises a transmission constellation to be used over the transmission link.

4. The method according to claim 1 wherein the apportioning plan comprises a bitmap, and the providing a portion of the data is performed dependent on whether a value in the bitmap is 0 or 1.

5. The method according to claim 1 wherein the plan associated with the transmission link comprises an Adaptive Code Modulation (ACM) constellation.

6. The method according to claim 1 wherein the data comprises at least one of the following types of data:
    a packet of data according to layer 2 of the seven layer OSI Basic Reference Model;
    data comprised in an Ethernet network;
    data comprised in a Time Division Multiplexed (TDM) network;
    data comprised in a PDH (Plesiochronous Digital Hierarchy) network;
    data comprised in an SDH (Synchronous Digital Hierarchy) network;
    data comprised in a SONET network;
    data comprised in an E1 network; and
    data comprised in a T1 network.

7. The method according to claim 1 further comprising sending data specifying the plan associated with the transmission link over the transmission link.

8. The method according to claim 1 wherein at least some of the data sent over a transmission link comprises an indication of which one of the plurality of apportioning plans was used to apportion the data to the transmission link.

9. A method for reassembling data from a plurality of portions of the data received over a plurality of parallel transmission links comprising:
    using, at a given instant, a plurality of apportioning plans;
    associating, at the given instant, each one of the plurality of apportioning plans with a respective one of the plurality of parallel transmission links;
    copying a first portion of the data from a first transmission link, according to a round-robin order among the transmission links and to the apportioning plan associated with the first transmission link, thereby producing partially reassembled data;
    from each one of the plurality of parallel transmission links, continuing in round-robin order, copying and appending a next portion of the data according to the apportioning plan associated with the transmission link to the partially reassembled data; and
    continuing the copying and appending until the data has been completely reassembled.

10. The method according to claim 9 wherein at least one plan associated with one of the transmission links is based, at least partly, on data specifying the at least one plan sent over the transmission link.

11. The method according to claim 9 wherein at least one plan associated with one of the transmission links comprises a transmission constellation.

12. The method according to claim 11 wherein the apportioning plan associated with the transmission link comprises an Adaptive Code Modulation (ACM) constellation.

13. The method according to claim 9 wherein the apportioning plan comprises a bitmap, and copying a first portion of the data and copying a next portion of the data are performed dependent on whether a value in the bitmap is 0 or 1.

14. Apparatus for transmitting data over a plurality of parallel transmission links, comprising:
a plurality of transmitters, each of the transmitters configured to transmit at least one portion of the data over one of the transmission links;
a plurality of plan units, each one of the plurality of plan units:
associated with a respective one of the plurality of transmitters; and
configured to use, at a given instant, separate apportioning plan associated with the respective one of the plurality of transmitters; and
a data splitting unit configured to provide at least one portion of the data, in round robin order, to each one of the plurality of transmitters, based on a signal from one of the plurality of plan units.

15. The apparatus according to claim 14 wherein each of the transmitters is configured to send a request for the at least one portion of the data to the data splitting unit, and the data splitting unit is configured to provide the at least one portion of the data in response to the request.

16. The apparatus according to claim 14 wherein the apportioning plan comprises a transmission constellation.

17. The apparatus according to claim 14 wherein the apportioning plan comprises a bitmap, and each one of the plan units sends the data splitting unit a signal to provide at least one portion of the data based on whether a value in the bitmap is 0 or 1.

18. The apparatus according to claim 14 further comprising changing the apportioning plan over time, corresponding to changes in a transmission capacity of the transmission link over which the transmitter is configured to transmit.

19. The apparatus according to claim 14 further comprising sending data specifying the apportioning plan associated with the transmitter over the transmission link for which the transmitter is configured.

20. Apparatus for reassembling data from a plurality of portions of the data received from a plurality of parallel transmission links comprising:
a plurality of receivers configured to receive at least one portion of the data from a plurality of respective associated transmission links;
a plurality of plan units, each one of the plurality of plan units associated with a respective one of the plurality of receivers and configured to use, at a given instant, an associated one of a plurality of apportioning plans; and
a data merging unit configured to:
copy a first portion of the data from a first receiver, according to a round-robin order among the receivers, and according to the apportioning plan associated with the first receiver, thereby producing partially reassembled data;
continuing in round-robin order among each one of the plurality of parallel transmission links, copy and append a next portion of the data according to the apportioning plan associated with the transmission link to the partially reassembled data; and
continue the copying and appending until the data has been completely reassembled.

21. The apparatus according to claim 20 wherein at least one plan associated with one of the transmission links is based, at least partly, on data specifying the at least one plan sent over the transmission link.

22. The apparatus according to claim 20 wherein at least one plan associated with one of the transmission links comprises a transmission constellation.

23. The apparatus according to claim 20 wherein each one of the apportioning plans comprises a bitmap, and the data merging unit performs the copying of a first portion of the data and the copying of the next portion of the data in round-robin order among each one of the plurality of parallel transmission links, dependent on whether a value in the bitmap comprised in the apportioning plan associated with the transmission link is 0 or 1.

24. The apparatus according to claim 20 wherein each one of the plurality of plan units selects an apportioning plan in accordance with bandwidth measurements provided by the corresponding one of the plurality of receivers.

* * * * *